United States Patent
Takeuchi et al.

(10) Patent No.: US 6,548,598 B2
(45) Date of Patent: Apr. 15, 2003

(54) THERMOPLASTIC RESIN COMPOSITION

(75) Inventors: Motokazu Takeuchi, Tokyo (JP); Masashi Shimakage, Tokyo (JP); Iwakazu Hattori, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/838,128

(22) Filed: Apr. 20, 2001

(65) Prior Publication Data

US 2001/0047055 A1 Nov. 29, 2001

(30) Foreign Application Priority Data

Apr. 21, 2000 (JP) .................................. 2000-120312

(51) Int. Cl.[7] .............................................. C08G 63/48
(52) U.S. Cl. ........................ 525/68; 525/69; 525/92 R; 525/92 D
(58) Field of Search ............................ 525/92 R, 92 D, 525/68, 69

(56) References Cited

U.S. PATENT DOCUMENTS

| | | |
|---|---|---|
| 3,306,874 A | 2/1967 | Hay |
| 4,166,055 A | 8/1979 | Lee, Jr. |
| 4,239,673 A | 12/1980 | Lee, Jr. |
| 4,383,082 A | 5/1983 | Lee, Jr. |
| 5,596,041 A | 1/1997 | Hashiguchi et al. |
| 5,936,037 A | 8/1999 | Tasaka |
| 6,045,883 A * | 4/2000 | Akiyama et al. ......... 525/92 D |
| 6,291,596 B1 | 9/2001 | Sasanuma et al. |

FOREIGN PATENT DOCUMENTS

| | | |
|---|---|---|
| EP | 0 115 712 | 8/1984 |
| EP | 0 510 206 | 10/1992 |
| EP | 0 580 051 | 1/1994 |
| EP | 0 835 908 | 4/1998 |
| JP | 43-19960 | 8/1943 |
| JP | 47-40473 | 10/1972 |
| JP | 52-17880 | 5/1977 |
| JP | 59-133203 | 7/1984 |
| JP | 62-218403 | 9/1987 |
| JP | 63-5401 | 1/1988 |
| JP | 63-152628 | 6/1988 |
| JP | 1-275605 | 11/1989 |
| JP | 5-222115 | 8/1993 |
| JP | 5-271325 | 10/1993 |
| JP | 5-271326 | 10/1993 |
| JP | 5-320471 | 12/1993 |
| JP | 6-16924 | 1/1994 |
| JP | 6-57130 | 3/1994 |
| JP | 7-90017 | 4/1995 |
| JP | 9-241499 | 9/1997 |
| JP | 9-302167 | 11/1997 |
| JP | 11-292924 | 10/1999 |
| JP | 2000-37632 | 2/2000 |
| WO | WO 00/15680 | 3/2000 |

OTHER PUBLICATIONS

Sakata et al. , CAPLUS AN 1997:754448 , abstracting JP 09302167 Nov. 1997.*

* cited by examiner

*Primary Examiner*—Jeffrey Mullis
(74) *Attorney, Agent, or Firm*—Oblon, Spivak, McClelland, Maier & Neustadt, P.C.

(57) ABSTRACT

The invention provides a resin composition comprising a polyphenylene ether-based resin and a polyolefin resin, having no interlayer peeling and exhibiting excellent heat resistance and dynamic properties such as impact resistance, rigidity and tensile breaking elongation. The thermoplastic resin composition is characterized in that it comprises (i) a polyphenylene ether-based resin, (ii) a polyolefin resin, and (iii) a hydrogenated block copolymer which consists of block A containing over 50 wt % of a vinyl aromatic compound component and block B containing over 50 wt % of a conjugated diene compound component, the 1,2- and 3,4-vinyl content of the conjugated diene compound component of the copolymer being 60–90%, the content of the bonding vinyl aromatic compound component being 30–70 wt % and at least 85% of the double bonds of the conjugated diene component being hydrogenated; the weight ratio ((i)/(ii)) of the (i) polyphenylene ether-based resin and the (ii) polyolefin resin is in the range of 95/5–5/95; and the (iii) hydrogenated block copolymer is present in the range of 1–50 parts by weight to 100 parts by weight of the total of the (i) polyphenylene ether-based resin and the (ii) polyolefin resin.

14 Claims, No Drawings

THERMOPLASTIC RESIN COMPOSITION

BACKGROUND OF THE INVENTION

The present invention relates to a thermoplastic resin composition comprising a polyolefin resin, a polyphenylene ether-based resin and a hydrogenated block copolymer with a specific structure, and exhibiting excellent tensile elongation, rigidity, impact resistance and heat resistance.

Polyphenylene ether-based resins are used in a variety of fields thanks to their high rigidity and excellent heat resistance and moldability, as well as relatively low cost among engineering plastics. Their drawback, however, is inferior impact resistance.

One method used as means of solving this problem is to blend cheap and highly impact resistant polyolefin resins with polyphenylene ether-based resins, but because polyphenylene ether-based resins and polyolefin resins are poorly compatible, the materials obtained by simple blending thereof have notably inferior properties such as lower impact resistance and interlayer peeling.

Various compositions have been studied which involve addition of styrene-based hydrogenated elastomers as compatibilizers, for the purpose of improving the compatibility between polyphenylene ether-based resins and polyolefin resins (see, for example, U.S. Pat. No. 4,166,055, U.S. Pat. No. 4,239,673, U.S. Pat. No. 4,383,082, European Patent Disclosure 115712, Japanese Unexamined Patent Publication No. Hei 5-320471, Japanese Unexamined Patent Publication No. Hei 6-16924, Japanese Unexamined Patent Publication No. Hei 6-57130, Japanese Unexamined Patent Publication No. Hei 9-241499, Japanese Unexamined Patent Publication No. Hei 9-302167, and the like.)

In particular, Japanese Unexamined Patent Publication No. Hei 9-302167 discloses a resin composition with excellent impact resistance and heat resistance by limiting the vinyl content of the conjugated diene block copolymers to 56–80% before hydrogenation of hydrogenated block copolymers.

However, conventionally used compatibilizers have not always provided sufficient enhancement of the properties of compositions, such as impact resistance, heat resistance, rigidity and resistance to interlayer peeling.

SUMMARY OF THE INVENTION

It is an object of the present invention to provide a resin composition comprising a polyphenylene ether-based resin and a polyolefin resin, which composition has no interlayer peeling and exhibits excellent heat resistance and dynamic properties such as impact resistance, rigidity and tensile breaking elongation, and especially excellent tensile breaking elongation.

A resin composition obtained according to the invention, by improved compatibility between the polyphenylene ether-based resin and polyolefin resin due to addition of a hydrogenated block copolymer with a specific structure, has excellent impact resistance, rigidity, heat resistance, tensile breaking elongation and interlayer peeling resistance, and can therefore be used as a material for various types of molded articles.

It may be used in the fields of food wrapping containers, trays, sheets, tubes, films, fibers, laminates, coating materials, electric and electronic parts such as connectors and printed circuit boards, chassis f or OA devices and household appliances such as computers, and industrial parts such as automobile parts, precision parts and construction materials.

DETAILED DESCRIPTION OF THE INVENTION

The present invention will now be explained in greater detail.

The polyphenylene ether-based resin used as component (i) for the invention may be a homopolymer or a copolymer which has a unit represented by the following formula as its main structural unit.

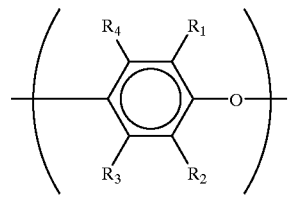

(where $R_1$, $R_2$, $R_3$ and $R_4$ may be the same or different and each is hydrogen, a halogen, a primary or secondary alkyl group of 1–7 carbons, a phenyl group, a haloalkyl group, an aminoalkyl group, an oxyhydrocarbon group or an oxyhalohydrocarbon group wherein at least two of the carbon atoms separated a halogen atom from oxygen atom).

The reduced viscosity of the polyphenylene ether-based resin (measured at a concentration of 0.5 g/dl in a chloroform solvent at 30° C.) is preferably in the range of 0.15–2 dl/g, and more preferably in the range of 0.2–1 dl/g.

As specific examples of polyphenylene ether-based resins there may be mentioned poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether). There may also be mentioned polyphenylene ether copolymers typical of which are copolymers of 2–6-dimethylphenol with other phenols (for example, 2,3,6-trimethylphenol and 2-methyl-6-butylphenol). Preferred among them are copolymers of poly(2,6-dimethyl-1,4-phenylene ether), 2,6-dimethylphenol and 2,3,6-trimethylphenol, with poly(2,6-dimethyl-1,4-phenylene ether) being especially preferred.

These polyphenylene ether-based resins may be easily produced by the processes described in such as U.S. Pat. No. 3306874, Japanese Patent Publication No. Sho 52-17880 and Japanese Unexamined Patent Publication No. Sho 63-152628.

The polyphenylene ether-based resins used for the invention include, in addition to the polyphenylene ether-based resins mentioned above, also modified polyphenylene ether-based resins prepared by reacting the aforementioned polyphenylene ether-based resins with styrene-based monomers and/or α,β-unsaturated carboxylic acids or their derivatives in the presence of or in the absence of a radical generator and in a molten state, solution state or slurry state, at a temperature of 80–350° C., where the aforementioned monomers are grafted or added at 0.01–10 wt %.

They may also be used combinations of unmodified polyphenylene ether-based resins with modified polyphenylene ether-based resins in any desired proportion.

A phosphorylated polyphenylene ether-based resin obtained by adding 9,10-dihydro-9-oxa-10-phosphaphenanthrene at 0.2–5 parts by weight to 100 parts by weight of the polyphenylene ether-based resin and melting and kneading the mixture may also be used for the invention as a polyphenylene ether-based resin with excellent color tone and flow properties.

In addition to the polyphenylene ether-based resins mentioned above, mixtures of polystyrene (for example, syndiotactic polystyrene) or high-impact polystyrene at up to 100 parts by weight to 100 parts by weight of these polyphenylene ether-based resins may also be suitably used as the (i) polyphenylene ether-based resin.

If the resulting resin composition must have durability as a heat resistant material, it is preferred to use a polyphenylene ether alone.

The polyolefin resins to be used as component (ii) for the invention are not particularly restricted, there may be mentioned polyethylene-based resins, polypropylene-based resins, polybutene-1-based resins, poly-4-methylpentene-1-based resins and the like as polyolefin resins. Polypropylene-based resins are preferred among these.

A polypropylene-based resin may be a simple propylene polymer or a copolymer with any of the monomers listed below.

As examples of preferred monomers to be used in such a copolymer there maybe mentioned linear α-olefins such as ethylene, butene-1, pentene-1, hexene-1, heptene-1 and octene-1; branched α-olefins such as 2-methylpropene-1,3-methylpentene-1,4-methylpentene-1,5-methylhexene-1,4-methylhexene-1 and 4,4-dimethylpentene-1; monocarboxylic acids such as acrylic acid, methacrylic acid, ethacrylic acid and crotonic acid; dicarboxylic acids such as maleic acid, fumaric acid, itaconic acid and citraconic acid, or their monoesters; acrylic acid esters or methacrylic acid esters such as methyl methacrylate, methyl acrylate and ethyl acrylate; vinyl aromatic compounds such as styrene, α-methylstyrene and p-methylstyrene; acid anhydrides such as maleic anhydride, itaconic anhydride, citraconic anhydride and aconitic anhydride; α,β-unsaturated nitriles such as acrylonitrile and methacrylonitrile; diene monomers such as 1,4-hexadiene, dicyclopentadiene and ethylidenenorbornane; as well as acrylamide, methacrylamide, maleimide and the like.

These copolymerizable monomers may be used alone or in combinations of two or more.

These copolymerizable monomers are copolymerized preferably at no more than 20 wt %, and more preferably at no more than 10 wt %. There are no particular restrictions on the manner of copolymerization when these are copolymerized, and for example, they may be random, block or graft copolymers, or mixtures thereof.

As preferred copolymers to be used as the polypropylene-based resin there may be mentioned propylene-ethylene copolymer, propylene-butene-1 copolymer and propylene-ethylene-butene-1 copolymer.

These polypropylene-based resins may be used alone or in combinations of two or more.

The polyolefin resin as component (ii) may also be a modified polyolefin resin with at least one functional group selected from among acid anhydride, carboxyl, hydroxyl, amino, isocyanate and epoxy groups.

The preferred range for the melt flow rate (MFR), which represents the melt flow property of the (ii) polyolefin resin used for the invention will be appropriately selected depending on the type of polyolefin resin. For a polypropylene-based resin, it is preferably 0.01–200 g/10 min and more preferably 0.1–150 g/10 min, as the value measured according to ASTM D1238, at 230° C. under a load of 2.16 kg.

The weight ratio of the (i) polyphenylene ether-based resin and (ii) polyolefin resin ((i)/(ii)) is in the range of 95/5–5/95, preferably 85/15–15/85 and more preferably 30/70–70/30. The impact resistance is lowered if the weight ratio exceeds 95/5 so that the polyphenylene ether-based resin is in excess, and the heat resistance is lowered if it is less than 5/95.

The hydrogenated block copolymer used as component (iii) of the invention is the hydrogenated product of a block copolymer comprising block A of a vinyl aromatic compound polymer composed mainly of a vinyl aromatic compound (hereunder referred to as "polymer block A") and block B of a conjugated diene compound polymer composed mainly of a conjugated diene compound (hereunder referred to as "polymer block B"). Throughout the present specification, this block copolymer will be referred to as the "pre-hydrogenated block copolymer".

The pre-hydrogenated block copolymer may have a block structure represented by (AB)nA, (AB)n, B(AB)n, (AB)nSi or (BA)nSi (where n is an integer of 1 or more). It is preferably a block structure represented by (AB)nA or (AB)nSi. Here, A and B represent polymer block A and polymer block B, respectively, and n is an integer of 1 or more, and preferably 1–4.

These block structures are not altered after the hydrogenation.

Polymer block A of the pre-hydrogenated block copolymer is a homopolymer block of a vinyl aromatic compound, or a copolymer block of a vinyl aromatic compound containing over 50 wt % of a vinyl aromatic compound component, and a conjugated diene compound.

Polymer block B of the pre-hydrogenated block copolymer is a homopolymer block of a conjugated diene compound or a copolymer block of a conjugated diene compound containing over 50 wt % of a conjugated diene compound component, and a vinyl aromatic compound and/or another monomer.

Here, the "vinyl aromatic compound component" means a structural unit derived from a vinyl aromatic compound in the polymer chain. The "Conjugated diene compound component" likewise means a structural unit derived from a conjugated diene compound in the polymer chain.

As vinyl aromatic compounds to be used for component (iii) there may be mentioned styrene, α-methylstyrene, p-methylstyrene, t-butylstyrene, divinylbenzene, N,N-dimethyl-p-aminoethylstyrene, 2,4-dimethylstyrene, N,N-diethyl-p-aminoethylstyrene, 2,4-diethylstyrene, vinylnaphthalene and vinylanthracene, among which styrene and α-methylstyrene are preferred. These compounds may be used alone or in combinations of two or more.

As conjugated diene compounds to be used for component (iii) there may be mentioned any one or more from among 1,3-butadiene, isoprene, 2,3-dimethyl-1,3-butadiene, 1,3-pentadiene, 2-methyl-1,3-pentadiene, 1,3-hexadiene, 4,5-dimethyl-1,3-octadiene, myrcene and chloroprene, among which 1,3-butadiene and isoprene are preferred. These compounds may be used alone or in combinations of two or more.

For example, when the conjugated diene compound is 1,3-butadiene, hydrogenation of polymer block B gives a rubber-like ethylene-butene-1 copolymer block or a block segment with a structure similar to a non-conjugated diene compound monomer-ethylene-butene-1 copolymer.

When the polymer block B is copolymer block, as other monomers to be used in polymer block B there may be mentioned styrene, t-butylstyrene, α-methylstyrene, p-methylstyrene, divinylbenzene, 1,1-diphenylstyrene, N,N-diethyl-p-aminostyrene and vinylpyridine.

As component (iii) there may also be used functional modified hydrogenated block copolymers into which there has been introduced at least one functional group selected from among acid anhydride, carboxyl, hydroxyl, amino, isocyanate, epoxy and alkoxysilyl groups, and blends of the aforementioned hydrogenated block copolymers with modified hydrogenated block copolymers may also be used in any proportion.

The 1,2- and 3,4-vinyl content of the conjugated diene compound component in the hydrogenated block copolymer is 60–90%, and preferably 60–85%. If the vinyl content is less than 60% the impact resistance of the composition is lowered, and if it is more than 90%, the rigidity is undesirably lowered.

The content of the bonding vinyl aromatic compound in the (iii) hydrogenated block copolymer is 30–70 wt %, preferably 30–65 wt % and more preferably 35–60 wt %. If the proportion of the bonding vinyl aromatic compound is less than 30 wt % the rigidity of the composition is lowered, and if it is more than 70 wt %, the impact resistance of the composition is undesirably lowered.

In the (iii) hydrogenated block copolymer of the invention, the degree of hydrogenation of the double bonds of the conjugated diene portion of the pre-hydrogenated block copolymer is at least 85%, preferably at least 90% and more preferably at least 95%. If the degree of hydrogenation is less than 85%, the rigidity and impact resistance of the composition are undesirably lowered.

The weight-average molecular weight of the (iii) hydrogenated block copolymer is measured by the GPC method reduced to polystyrene, and it is preferably in the range of 10,000 to 1 million, and more preferably 20,000 to 500,000.

The weight-average molecular weight of at least one polymer block A in the pre-hydrogenated block copolymer is preferably 15,000 or more, and more preferably 20,000 or more. The weight-average molecular weight less than 15,000 may lead to a problematically insufficient balance between rigidity, impact resistance and heat resistance.

It is preferred for the pre-hydrogenated block copolymer to have a structure represented by A1-B-A2 (where A1 and A2 are each block A of vinyl aromatic compounds with different structures), for the weight-average molecular weight of the polymer block at one end (A1) to be 15,000 or more, and for the copolymer block at the other end (A2) to be such that the weight-average molecular weight ratio of A2/A1 is 0.9 or less, (preferably 0.8 or less, more preferably 0.6 or less, and even more preferably 0.5 or less). It is more preferred for the polymer block at one end (A1) to have a weight-average molecular weight of 17,000 or more, and for the copolymer block at the other end (A2) to be such that the weight average molecular weight ratio A2/A1 is 0.8 or less (preferably 0.6 or less, and more preferably 0.5 or less). It is particularly preferred for the polymer block at one end (A1) to have a weight-average molecular weight of 20,000 or more, and for the copolymer block at the other end (A2) to be such that the weight-average molecular weight ratio A2/A1 is 0.8 or less (preferably 0.6 or less, and more preferably 0.5 or less). The weight-average molecular weight of the polymer block at one end (A1) less than 15,000 may lead to a problematically insufficient balance between rigidity, impact resistance and heat resistance. And the weight-average molecular weight ratio A2/A1 more than 0.9 may lead to a problematically insufficient balance between rigidity, impact resistance and heat resistance. The structure B-A1-B-A2 or A1-B-A2-B may also be suitably used, where B is added to either end of the structure represented by A1-B-A2.

If the pre-hydrogenated block copolymer has the aforementioned structure and the molecular weights of the polymer blocks at both ends are in the ranges given above, favorable results will be achieved as a compatibilizer for the polyphenylene ether-based resin and polyolefin resin.

The content of the (iii) hydrogenated block copolymer is 1–50 parts by weight and preferably 1–40 parts by weight to 100 parts by weight of the total of the (i) polyphenylene ether-based resin and the (ii) polyolefin resin. If the content of the hydrogenated block copolymer is less than 1 part by weight the enhancing effect will be insufficient, and if it is over 50 parts by weight the rigidity will be undesirably lowered. So long as the content is within this range, there is no problem with combining two or more different types of the (iii) hydrogenated block copolymer.

Any method may be used for production of the hydrogenated block copolymer of the invention, and generally it may be obtained by living copolymerization in an organic solvent using an organic alkali metal compound as the initiator, followed by hydrogenation reaction.

As organic solvents there may be used hydrocarbon solvents such as pentane, hexane, heptane, octane, methylcyclopentane, cyclohexane, benzene, xylene and toluene. Organic lithium compounds are preferred as organic alkali compounds used for the polymerization initiator. An organic lithium compound used may be an organic monolithium compound, organic dilithium compound or organic polylithium compound. As specific examples there may be mentioned ethyllithium, n-propyllithium, isopropyllithium, n-butyllithium, sec-butyllithium, t-butyllithium, phenyllithium, hexamethylenedilithium, butadienyllithium and isopropenyldilithium, which may be used in an amount of 0.04–2.0 part by weight to 100 parts by weight of the monomer.

For adjustment of the vinyl content of the conjugated diene compound in polymer block B, the aforementioned organic solvents may be used together with Lewis bases, for example, ethers, amines and the like, and specifically diethyl ether, tetrahydrofuran, propylethers, butylethers and higher ethers, ether derivatives of polyalkylene glycol, such as, ethyleneglycol dibutyl ether, diethyleneglycol dimethyl ether, propyleneglycol diethyl ether and propyleneglycol ethylpropyl ether, and as amines, tertiary amines such as tetramethylethylenediamine, pyridine and tributylamine.

The polymerization reaction may usually be conducted at −30° C. to +150° C., with isothermal temperature control, or as adiabatic polymerization under increasing temperature. Branched types such as (AB)nSi are produced by coupling reaction with a multifunctional coupling agent. Specifically there may be mentioned tetrachlorosilane, trichlorosilane and methyldichlorosilane.

By addition of hydrogen to the polymerized block copolymer it is possible to obtain a hydrogenated block copolymer according to the invention with hydrogen added to the double bond residues of the conjugated diene portion. To obtain a solution of such a block copolymer, the block copolymer may be hydrogenated either directly or after dissolution in an inert solvent, in the presence of a hydrogenation catalyst, at 20–150° C. and under hydrogen pressurized at 0.1–10 MPa. As inert solvents used under hydrogen there may be mentioned hydrocarbon solvents such as hexane, heptane, cyclohexane, benzene, toluene and ethylbenzene, or polar solvents such as methylethyl ketone, ethyl acetate, ethyl ether and tetrahydrofuran.

As hydrogenation catalysts there may be used catalysts comprising compounds that contain metals of Groups IIIB-VIII of the IUPAC Periodic Table. Such catalysts include heterogeneous carrier type catalysts wherein a metal such as Ni, Pt, Pd or Ru is carried on a carrier such as carbon, silica, alumina, diatomaceous earth or the like. Additional examples include homogeneous Ziegler catalysts prepared by combining an organic salt or acetylacetone salt of a metal element such as Ni, Co, Fe or Cr with a reducing agent such as organic aluminum. There may also be used homogeneous organic chelate catalysts such as organic metal compounds of Ru or Rh, and homogeneous catalysts comprising titanocene compounds, zirconocene compounds and hafnocene compounds. Any one of these hydrogenation catalysts may be used alone, or two or more may be used in combination. Specific hydrogenation catalysts are described in Japanese Unexamined Patent Publication No. Hei 1-275605, Japanese Unexamined Patent Publication No. Hei 5-271326, Japanese Unexamined Patent Publication No. Hei 5-271325, Japanese Unexamined Patent Publication No. Hei 5-222115, Japanese Unexamined Patent Publication No. Hei 11-292924, Japanese Unexamined Patent Publication No. 2000-37632, Japanese Unexamined Patent Publication No. Sho 59-133203, Japanese Unexamined Patent Publication No. Sho 63-5401, Japanese Unexamined Patent Publication No. Sho 62-218403, Japanese Unexamined Patent Publication No. Hei 7-90017, Japanese Patent Publication No. Sho 43-19960 and Japanese Patent Publication No. Sho 47-40473.

The degree of hydrogenation of the conjugated diene portion is adjusted by the amount of the hydrogenation catalyst, the hydrogen pressure during the hydrogenation reaction and the reaction time. If necessary, the catalyst residue may be removed from the hydrogenated block copolymer solution, a phenol-based, phosphorus-based or amino-based age resister may be added, and the hydrogenated block copolymer easily isolated from the polymer solution. The hydrogenated block copolymer may be isolated, for example, by a method of adding acetone or an alcohol to the hydrogenated block copolymer to precipitate it, or a method of pouring the polymer solution into hot water while stirring, and distilling off the solvent.

So long as the object of the invention is not impeded, the thermoplastic resin composition of the invention may also contain various additives, if necessary, including stabilizers such as antioxidants, weather resistant agents, metal inactivating agents, photostabilizers, ultraviolet absorbers, thermostabilizers and copper inhibitors; bactericides and fungicides, dispersing agents, softening agents, plasticizers, silicon oil, flame retardants, crosslinking agents, co-crosslinking agents, vulcanizing agents, vulcanizing aids, foaming agents, foaming aids, coloring agents such as titanium oxide and carbon black, metal powders such as ferrite, inorganic fibers such as glass fibers and metal fibers, organic fibers such as carbon fibers and aramid fibers, composite fibers, inorganic whiskers such as potassium titanate whiskers, fillers such as glass beads, glass balloons, glass flakes, asbestos, mica, zeolite, calcium carbonate, talc, silica, calcium silicate, hydrotalcite, kaolin, diatomaceous earth, graphite, pumice, Ebo powder, cotton flock, cork powder, barium sulfate, fluorine resin, polymer beads and the like, or mixtures thereof, other fillers such as polyolefin wax, cellulose powder, rubber powder, and low molecular weight polymers.

Rubber polymers and thermoplastic resins may also be appropriately added so long as the object of the invention is not impeded.

For production of the thermoplastic resin composition of the invention there may be used any conventional publicly known kneading machine such as an extruder, a pressure kneader, a Banbury mixer or the like, or a combination of such kneaders. For the kneading, each of the components may be kneaded at once, or a multistage separate kneading method may be employed wherein kneading of any of the components is followed by addition and kneading of the remaining components. For example, there may be mentioned a two-stage separate kneading method in which the polyphenylene ether resin and the hydrogenated block copolymer are kneaded and then the polyolefin resin is added, or a two-stage separate kneading method in which the polyolefin resin and hydrogenated block copolymer are kneaded and then the polyphenylene ether-resin is added. Alternatively, the resin composition obtained in this manner may be molded by a publicly known method such as injection molding, extrusion molding, rotational molding, press molding, blow molding or the like. Because the kneading temperature and molding temperature are high at 200–300° C., an age resister may be added before or during the kneading to prevent deterioration of the thermoplastic resin composition.

The present invention will now be explained in greater detail by way of the following examples, with the understanding that these examples are in no way intended to be restrictive on the scope of the invention.

The chemical compositions and evaluations in the examples were determined by the following methods.
(1) Bonding Vinyl Aromatic Compound Content This was measured by preparing a calibration curve by infrared analysis, based on absorption of phenyl groups at 699 cm$^{-1}$.
(2) Conjugated Diene 1,2-Vinyl Content This was calculated by the Morello method, using infrared analysis.
(3) Conjugated Diene Hydrogenation Degree This was calculated from a $^1$H-NMR spectrum at 90 MHz, using carbon tetrachloride as the solvent.
(4) Weight-Average Molecular Weight This was determined reduced to polystyrene, using tetrahydrofuran as the solvent and gel permeation chromatography (GPC) at 38° C.
(5) Rigidity The flexural modulus was measured at a temperature of 23° C. by the three-point bending test according to ASTM D790, as an index of the rigidity.
(6) Impact Resistance The Izod impact strength was measured (with notches) at a temperature of 23° C. with an Izod impact tester according to ASTM D256, as an index of the impact resistance.
(7) Tensile Breaking Elongation The tensile breaking elongation was measured by a tensile test with a test strip (Type 1) at a temperature of 23° C. according to ASTM D638.
(8) Heat Resistance This was measured under a load of 18.6 kg/cm$^2$, according to ASTM D648.
(9) Interlayer Peeling A cutter was used to cut a notch in a test strip prepared by molding the resin composition into a flat shape by injection molding, and after attaching cellophane tape to the notch and pulling it, it was observed whether the surface peeled or not and visual evaluation was made according to the following criteria.

○: No peeling of surface.

x: Peeling of surface.

The components used in the examples, comparative examples and the evaluation formulations were as follows.
Component (i)

Polyphenylene ether: Polyphenylene ether with reduced viscosity of 0.45 (dl/g), obtained by oxidation-reduction of 2,6-xylenol.
Component (ii)

Polypropylene: J705 (MFR: 10 g/10 min, 230° C., 2.16 kg load, product of Grand Polymer Co., Ltd.)
Component (iii)

The hydrogenated block copolymers used were produced by the following methods.

[Production of Hydrogenated Block Copolymers]
(iii-1)

After charging 5 kg of deaired and dewatered cyclohexane, 350 g of styrene and 50 g of tetrahydrofuran in to a 10 liter autoclave, 1.2 g of n-butyllithium was added and polymerization was initiated at 30° C. When the polymerization conversion reached approximately 100%, 300 g of 1,3-butadiene was added and polymerization was completed. Polymerization was then continued after adding 350 g of styrene.

The weight-average molecular weight of the obtained polymer was 110,000. The 1,2-vinyl content of the butadiene portion was 65%.

The living Li content of the polymer solution was measured to be 10.5 millimoles. After adding 1.92 g of benzophenone to the system, it was stirred for 10 minutes. Color change of the polymer solution confirmed an absence of living lithium at the end of the polymer as the living anion.

Next, a reaction product obtained by pre-reacting 2.18 g of benzophenone dissolved in 20 ml of cyclohexane with 0.73 g of n-butyllithium in a nitrogen atmosphere for 10 minutes was charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm$^2$G for hydrogenation reaction at 90° C. for 30 minutes, and the reaction was suspended when the total accumulated hydrogen flow reached 130 L.

The degree of hydrogenation of the obtained hydrogenated polymer was 98%.

(iii-2)

After charging 5 kg of deaired and dewatered cyclohexane, 250 g of styrene and 150 g of tetrahydrofuran into a 10 liter autoclave, 1.3 g of n-butyllithium was added and polymerization was initiated at 30° C. When the polymerization conversion reached approximately 100%, 500 g of 1,3-butadiene was added and polymerization was completed. Polymerization was then continued after adding 250 g of styrene.

The weight-average molecular weight of the obtained polymer was 100,000. The 1,2-vinyl content of the butadiene portion was 83%.

The living Li content of the polymer solution was measured to be 12.9 millimoles. After adding 2.35 g of benzophenone to the system, it was stirred for 10 minutes. Color change of the polymer solution confirmed an absence of living lithium at the end of the polymer as the living anion.

Next, a reaction product obtained by pre-reacting 1.75 g of benzophenone dissolved in 20 ml of cyclohexane with 0.57 g of n-butyllithium in a nitrogen atmosphere for 10 minutes was charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm$^2$G for hydrogenation reaction at 90° C. for 30 minutes, and the reaction was suspended when the total accumulated hydrogen flow reached 210 L.

The degree of hydrogenation of the obtained hydrogenated polymer was 95%.

(iii-3)

After charging 5 kg of deaired and dewatered cyclohexane, 150 g of styrene and 50 g of tetrahydrofuran into a 10 liter autoclave, 1.0 g of n-butyllithium was added and polymerization was initiated at 30° C. When the polymerization conversion reached approximately 100%, 700 g of 1,3-butadiene was added and polymerization was completed. Polymerization was then continued after adding 150 g of styrene.

The weight-average molecular weight of the obtained polymer was 150,000. The 1,2-vinyl content of the butadiene portion was 60%.

The living Li content of the polymer solution was measured to be 9.7 millimoles. After adding 1.78 g of benzophenone to the system, it was stirred for 10 minutes. Color change of the polymer solution confirmed an absence of living lithium at the end of the polymer as the living anion.

Next, a reaction product obtained by pre-reacting 2.32 g of benzophenone dissolved in 20 ml of cyclohexane with 0.78 g of n-butyllithium in a nitrogen atmosphere for 10 minutes was charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm$^2$G for hydrogenation reaction at 90° C. for 40 minutes, and the reaction was suspended when the total accumulated hydrogen flow reached 130 L.

The degree of hydrogenation of the obtained hydrogenated polymer was 97%.

(iii-4)

After charging 5 kg of deaired and dewatered cyclohexane, 500 g of styrene and 150 g of tetrahydrofuran into a 10 liter autoclave, 1.8 g of n-butyllithium was added and polymerization was initiated at 30° C. When the polymerization conversion reached approximately 100%, 500 g of 1,3-butadiene was added, polymerization was completed, and then reaction was carried out for 20 minutes after adding 0.956 g of silicon tetrachloride.

The weight-average molecular weight of the obtained polymer was 180,000. The 1,2-vinyl content of the butadiene portion was 88%. The coupling efficiency was 90%.

Next, 4.1 g of benzophenone dissolved in 20 ml of cyclohexane and 1.4 g of n-butyllithium were charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm$^2$G for hydrogenation reaction at 90° C. for 30 minutes, and the reaction was suspended when the total accumulated hydrogen flow reached 210 L.

The degree of hydrogenation of the obtained hydrogenated polymer was 98%.

(iii-5)

After charging 5 kg of deaired and dewatered cyclohexane, 400 g of styrene and 150 g of tetrahydrofuran into a 10 liter autoclave, 1.3 g of n-butyllithium was added and polymerization was initiated at 30° C. When the polymerization conversion reached approximately 100%, 500 g of 1,3-butadiene was added and polymerization was completed. Polymerization was then continued after adding 100 g of styrene.

The weight-average molecular weight of the obtained polymer was 100,000. The 1,2-vinyl content of the butadiene portion was 80%.

The living Li content of the polymer solution was measured to be 12.9 millimoles. After adding 2.35 g of benzophenone to the system, it was stirred for 10 minutes. Color change of the polymer solution confirmed an absence of living lithium at the end of the polymer as the living anion.

Next, a reaction product obtained by pre-reacting 1.75 g of benzophenone dissolved in 20 ml of cyclohexane with 0.57 g of n-butyllithium in a nitrogen atmosphere for 10 minutes was charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm$^2$G for hydrogenation reaction at 90° C. for 30 minutes, and the reaction was suspended when the total accumulated hydrogen flow reached 210 L.

The degree of hydrogenation of the obtained hydrogenated polymer was 98%.

(iii-6)

After charging 5 kg of deaired and dewatered cyclohexane, 550 g of styrene and 150 g of tetrahydrofuran into a 10 liter autoclave, 1.3 g of n-butyllithium was added and polymerization was initiated at 30° C. When the polymerization conversion reached approximately 100%, 300 g of 1,3-butadiene was added and polymerization was completed. Polymerization was then continued after adding 150 g of styrene.

The weight-average molecular weight of the obtained polymer was 100,000. The 1,2-vinyl content of the butadiene portion was 75%.

The living Li content of the polymer solution was measured to be 11.6 millimoles. After adding 2.13 g of benzophenone to the system, it was stirred for 10 minutes. Color change of the polymer solution confirmed an absence of living lithium at the end of the polymer as the living anion.

Next, a reaction product obtained by pre-reacting 1.97 g of benzophenone dissolved in 20 ml of cyclohexane with 0.66 g of n-butyllithium in a nitrogen atmosphere for 10 minutes was charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm G for hydrogenation reaction at 90° C. for 30 minutes, and the reaction was suspended when the total accumulated hydrogen flow reached 130 L.

The degree of hydrogenation of the obtained hydrogenated polymer was 95%.

(iii-7)

After charging 5 kg of deaired and dewatered cyclohexane, 400 g of styrene and 150 g of tetrahydrofuran into a 10 liter autoclave, 0.6 g of n-butyllithium was added and polymerization was initiated at 30° C. When the polymerization conversion reached approximately 100%, 500 g of 1,3-butadiene was added and polymerization was completed. Polymerization was then continued after adding 100 g of styrene.

The weight-average molecular weight of the obtained polymer was 200,000. The 1,2-vinyl content of the butadiene portion was 80%.

The living Li content of the polymer solution was measured to be 6.5 millimoles. After adding 1.19 g of benzophenone to the system, it was stirred for 10 minutes. Color change of the polymer solution confirmed an absence of living lithium at the end of the polymer as the living anion.

Next, a reaction product obtained by pre-reacting 2.91 g of benzophenone dissolved in 20 ml of cyclohexane with 0.98 g of n-butyllithium in a nitrogen atmosphere for 10 minutes was charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm$^2$G for hydrogenation reaction at 90° C. for 30 minutes, and the reaction was suspended when the total accumulated hydrogen flow reached 210 L.

The degree of hydrogenation of the obtained hydrogenated polymer was 96%.

(iii-8)

After charging 5 kg of deaired and dewatered cyclohexane, 225 g of styrene and 150 g of tetrahydrofuran into a 10 liter autoclave, 0.9 g of n-butyllithium was added and polymerization was initiated at 30° C. When the polymerization conversion reached approximately 100%, 700 g of 1,3-butadiene was added and polymerization was completed. Polymerization was then continued after adding 75 g of styrene.

The weight-average molecular weight of the obtained polymer was 130,000. The 1,2-vinyl content of the butadiene portion was 78%.

The living Li content of the polymer solution was measured to be 11.2 millimoles. After adding 2.06 g of benzophenone to the system, it was stirred for 10 minutes. Color change of the polymer solution confirmed an absence of living lithium at the end of the polymer as the living anion.

Next, a reaction product obtained by pre-reacting 2.04 g of benzophenone dissolved in 20 ml of cyclohexane with 0.68 g of n-butyllithium in a nitrogen atmosphere for 10 minutes was charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm$^2$G for hydrogenation reaction at 90° C. for 40 minutes, and the reaction was suspended when the total accumulated hydrogen flow reached 210 L.

The degree of hydrogenation of the obtained hydrogenated polymer was 95%.

(iii-9)

After charging 5 kg of deaired and dewatered cyclohexane, 300 g of styrene and 150 g of tetrahydrofuran into a 10 liter autoclave, 1.0 g of n-butyllithium was added and polymerization was initiated at 30° C. When the polymerization conversion reached approximately 100%, 550 g of 1,3-butadiene was added and polymerization was completed. Polymerization was then continued after adding 150 g of styrene.

The weight-average molecular weight of the obtained polymer was 100,000. The 1,2-vinyl content of the butadiene portion was 80%.

The living Li content of the polymer solution was measured to be 12.5 millimoles. After adding 2.25 g of benzophenone to the system, it was stirred for 10 minutes. Color change of the polymer solution confirmed an absence of living lithium at the end of the polymer as the living anion.

Next, a reaction product obtained by pre-reacting 1.85 g of benzophenone dissolved in 20 ml of cyclohexane with 0.6 g of n-butyllithium in a nitrogen atmosphere for 10 minutes was charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm$^2$G for hydrogenation reaction at 90° C. for 40 minutes, and the reaction was suspended when the total accumulated hydrogen flow reached 230 L.

The degree of hydrogenation of the obtained hydrogenated polymer was 99%.

(iii-10)

After charging 5 kg of deaired and dewatered cyclohexane, 200 g of styrene and 100 g of tetrahydrofuran into a 10 liter autoclave, 1.2 g of n-butyllithium was added and polymerization was initiated at 30° C. When the polymerization conversion reached approximately 100%, 700 g of 1,3-butadiene was added and polymerization was completed. Polymerization was then continued after adding 100 g of styrene.

The weight-average molecular weight of the obtained polymer was 80,000. The 1,2-vinyl content of the butadiene portion was 70%.

The living Li content of the polymer solution was measured to be 15 millimoles. After adding 2.73 g of benzophenone to the system, it was stirred for 10 minutes. Color change of the polymer solution confirmed an absence of living lithium at the end of the polymer as the living anion.

Next, a reaction product obtained by pre-reacting 1.37 g of benzophenone dissolved in 20 ml of cyclohexane with 0.5 g of n-butyllithium in a nitrogen atmosphere for 10 minutes was charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm$^2$G for hydrogenation reaction at 90° C. for 60 minutes, and the reaction was suspended when the total accumulated hydrogen flow reached 290 L.

The degree of hydrogenation of the obtained hydrogenated polymer was 98%.

(iii-11)

After charging 5 kg of deaired and dewatered cyclohexane, 250 g of styrene and 30 g of tetrahydrofuran into a 10 liter autoclave, 1.1 g of n-butyllithium was added and polymerization was initiated at 30° C. When the polymerization conversion reached approximately 100%, 600 g of 1,3-butadiene was added and polymerization was completed. Polymerization was then continued after adding 150 g of styrene.

The weight-average molecular weight of the obtained polymer was 90,000. The 1,2-vinyl content of the butadiene portion was 60%.

The living Li content of the polymer solution was measured to be 13.8 millimoles. After adding 2.5 g of benzophenone to the system, it was stirred for 10 minutes. Color change of the polymer solution confirmed an absence of living lithium at the end of the polymer as the living anion.

Next, a reaction product obtained by pre-reacting 1.6 g of benzophenone dissolved in 20 ml of cyclohexane with 0.52 g of n-butyllithium in a nitrogen atmosphere for 10 minutes was charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm$^2$G for hydrogenation reaction at 90° C. for 50 minutes, and the reaction was suspended when the total accumulated hydrogen flow reached 250 L.

The degree of hydrogenation of the obtained hydrogenated polymer was 97%.

(iii-12)

After charging 5 kg of deaired and dewatered cyclohexane, 225 g of styrene and 150 g of tetrahydrofuran into a 10 liter autoclave, 0.9 g of n-butyllithium was added and polymerization was initiated at 30° C. When the polymerization conversion reached approximately 100%, 100 g of styrene and 600 g of 1,3-butadiene were added and polymerization was completed. Polymerization was then continued after adding 75 g of styrene.

The weight-average molecular weight of the obtained polymer was 130,000. The 1,2-vinyl content of the butadiene portion was 75%.

The living Li content of the polymer solution was measured to be 11.2 millimoles. After adding 2.06 g of benzophenone to the system, it was stirred for 10 minutes. Color change of the polymer solution confirmed an absence of living lithium at the end of the polymer as the living anion.

Next, a reaction product obtained by pre-reacting 2.04 g of benzophenone dissolved in 20 ml of cyclohexane with 0.68 g of n-butyllithium in a nitrogen atmosphere for 10 minutes was charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm$^2$G for hydrogenation reaction at 90° C. for 50 minutes, and the reaction was suspended when the total accumulated hydrogen flow reached 250 L.

The degree of hydrogenation of the obtained hydrogenated polymer was 99%.

(iii-13)

After charging 5 kg of deaired and dewatered cyclohexane, 400 g of styrene and 50 g of tetrahydrofuran into a 10 liter autoclave, 1.3 g of n-butyllithium was added and polymerization was initiated at 30° C. When the polymerization conversion reached approximately 100%, 200 g of 1,3-butadiene was added and polymerization was completed. Polymerization was then continued after adding 400 g of styrene.

The weight-average molecular weight of the obtained polymer was 100,000. The 1,2-vinyl content of the butadiene portion was 65%.

The living Li content of the polymer solution was measured to be 11.0 millimoles. After adding 2.02 g of benzophenone to the system, it was stirred for 10 minutes. Color change of the polymer solution confirmed an absence of living lithium at the end of the polymer as the living anion.

Next, a reaction product obtained by pre-reacting 2.08 g of benzophenone dissolved in 20 ml of cyclohexane with 0.70 g of n-butyllithium in a nitrogen atmosphere for 10 minutes was charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm$^2$G for hydrogenation reaction at 90° C. for 20 minutes, and the reaction was suspended when the total accumulated hydrogen flow reached 85 L.

The degree of hydrogenation of the obtained hydrogenated polymer was 98%.

(iii-14)

After charging 5 kg of deaired and dewatered cyclohexane, 100 g of styrene and 150 g of tetrahydrofuran into a 10 liter autoclave, 1.3 g of n-butyllithium was added and polymerization was initiated at 30° C. When the polymerization conversion reached approximately 100%, 800 g of 1,3-butadiene was added and polymerization was completed. Polymerization was then continued after adding 100 g of styrene.

The weight-average molecular weight of the obtained polymer was 100,000. The 1,2-vinyl content of the butadiene portion was 80%.

The living Li content of the polymer solution was measured to be 15.6 millimoles. After adding 2.86 g of benzophenone to the system, it was stirred for 10 minutes. Color change of the polymer solution confirmed an absence of living lithium at the end of the polymer as the living anion.

Next, a reaction product obtained by pre-reacting 1.24 g of benzophenone dissolved in 20 ml of cyclohexane with 0.40 g of n-butyllithium in a nitrogen atmosphere for 10 minutes was charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm$^2$G for hydrogenation reaction at 90° C. for 40 minutes, and the reaction was suspended when the total accumulated hydrogen flow reached 340 L.

The degree of hydrogenation of the obtained hydrogenated polymer was 95%.

(iii-15)

After charging 5 kg of deaired and dewatered cyclohexane, 250 g of styrene and 20 g of tetrahydrofuran into a 10 liter autoclave, 1.3 g of n-butyllithium was added and polymerization was initiated at 30° C. When the polymerization conversion reached approximately 100%, 500 g of 1,3-butadiene was added and polymerization was completed. Polymerization was then continued after adding 250 g of styrene.

The weight-average molecular weight of the obtained polymer was 100,000. The 1,2-vinyl content of the butadiene portion was 50%.

The living Li content of the polymer solution was measured to be 12.9 millimoles. After adding 2.35 g of benzophenone to the system, it was stirred for 10 minutes. Color change of the polymer solution confirmed an absence of living lithium at the end of the polymer as the living anion.

Next, a reaction product obtained by pre-reacting 1.75 g of benzophenone dissolved in 20 ml of cyclohexane with 0.57 g of n-butyllithium in a nitrogen atmosphere for 10 minutes was charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm$^2$G for hydrogenation reaction at 90° C. for 30 minutes, and the reaction was suspended when the total accumulated hydrogen flow reached 210 L.

The degree of hydrogenation of the obtained hydrogenated polymer was 97%.

(iii-16)

After charging 5 kg of deaired and dewatered cyclohexane, 250 g of styrene and 300 g of tetrahydrofuran into a 10 liter autoclave, 1.3 g of n-butyllithium was added and polymerization was initiated at 30° C. When the polymerization conversion reached approximately 100%, 500 g of 1,3-butadiene was added and polymerization was completed. Polymerization was then continued after adding 250 g of styrene.

The weight-average molecular weight of the obtained polymer was 100,000. The 1,2-vinyl content of the butadiene portion was 93%.

The living Li content of the polymer solution was measured to be 12.9 millimoles. After adding 2.35 g of benzophenone to the system, it was stirred for 10 minutes. Color change of the polymer solution confirmed an absence of living lithium at the end of the polymer as the living anion.

Next, a reaction product obtained by pre-reacting 1.75 g of benzophenone dissolved in 20 ml of cyclohexane with 0.57 g of n-butyllithium in a nitrogen atmosphere for 10 minutes was charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm$^2$G for hydrogenation reaction at 90° C. for 30 minutes, and the reaction was suspended when the total accumulated hydrogen flow reached 210 L.

The degree of hydrogenation of the obtained hydrogenated polymer was 96%.

(iii-17)

After charging 5 kg of deaired and dewatered cyclohexane, 250 g of styrene and 150 g of tetrahydrofuran into a 10 liter autoclave, 1.3 g of n-butyllithium was added and polymerization was initiated at 30° C. When the polymerization conversion reached approximately 100%, 500 g of 1,3-butadiene was added and polymerization was completed. Polymerization was then continued after adding 250 g of styrene.

The weight-average molecular weight of the obtained polymer was 100,000. The 1,2-vinyl content of the butadiene portion was 80%.

The living Li content of the polymer solution was measured to be 12.9 millimoles. After adding 2.35 g of benzophenone to the system, it was stirred for 10 minutes. Color change of the polymer solution confirmed an absence of living lithium at the end of the polymer as the living anion.

Next, a reaction product obtained by pre-reacting 1.75 g of benzophenone dissolved in 20 ml of cyclohexane with 0.57 g of n-butyllithium in a nitrogen atmosphere for 10 minutes was charged in, and then a component prepared by premixing 0.52 g of bis(cyclopentadienyl)titanium dichloride and 1.89 g of diethylaluminum chloride dissolved in 10 ml of toluene in a nitrogen atmosphere was charged into the autoclave and the mixture was stirred. Hydrogen gas was supplied at a pressure of 8 kg/cm$^2$G for hydrogenation reaction at 90° C. for 20 minutes, and the reaction was suspended when the total accumulated hydrogen flow reached 170 L.

The degree of hydrogenation of the obtained hydrogenated polymer was 80%.

The microstructures, the degree of hydrogenation of double bonds of the butadiene component after hydrogenation and the weight-average molecular weights of the pre-hydrogenated block copolymers of the hydrogenated block copolymers (iii-1 to iii-17) are shown in Tables 1 to 4.

In the structures of the pre-hydrogenated block copolymers, (1) and (2) represent the following structures.

(1): A1-B-A2

(2): (A1-B)$_4$X (where X is a coupling residue)

TABLE 1

| Hydrogenated block copolymer | iii-1 | iii-2 | iii-3 | iii-4 | iii-5 |
|---|---|---|---|---|---|
| Pre-hydrogenated copolymer structure | (1) | (1) | (1) | (2) | (1) |
| A1 weight-average molecular weight($\times 10^4$) | 3.9 | 2.4 | 2.3 | 2.5 | 4.0 |
| A2 weight-average molecular weight($\times 10^4$) | 4.0 | 2.6 | 2.2 | — | 1.0 |
| Styrene(ST) content in A1 (wt %) | 35 | 25 | 15 | 50 | 40 |
| Styrene(ST) content in A2 (wt %) | 35 | 25 | 15 | — | 10 |
| Butadiene(BD) content in B (wt %) | 30 | 50 | 70 | 50 | 50 |
| 1,2-vinyl content (%) | 65 | 83 | 60 | 88 | 80 |
| ST/BD (weight ratio) | 70/30 | 50/50 | 30/70 | 50/50 | 50/50 |
| Hydrogenation degree (%) | 98 | 95 | 97 | 98 | 98 |
| Weight-average molecular weight($\times 10^4$) | 11 | 10 | 15 | 18 | 10 |

TABLE 2

| Hydrogenated block copolymer | iii-6 | iii-7 | iii-8 | iii-9 |
|---|---|---|---|---|
| Pre-hydrogenated copolymer structure | (1) | (1) | (1) | (1) |
| A1 weight-average molecular weight($\times 10^4$) | 5.5 | 8.0 | 3.0 | 2.5 |
| A2 weight-average molecular weight($\times 10^4$) | 1.5 | 1.9 | 1.0 | 1.5 |
| Styrene(ST) content in A1 (wt %) | 55 | 40 | 22.5 | 30 |
| Styrene(ST) content in A2 (wt %) | 15 | 10 | 7.5 | 15 |
| Butadiene(BD) content in B (wt %) | 30 | 50 | 70 | 55 |
| 1,2- vinyl content (%) | 75 | 80 | 78 | 80 |
| ST/BD (weight ratio) | 70/30 | 50/50 | 30/70 | 45/55 |
| Hydrogenation degree (%) | 95 | 96 | 95 | 99 |
| Weight-average molecular weight($\times 10^4$) | 10 | 20 | 13 | 10 |

TABLE 3

| Hydrogenated block copolymer | iii-10 | iii-11 | iii-12 | iii-13 |
|---|---|---|---|---|
| Pre-hydrogenated copolymer structure | (1) | (1) | (1) | (1) |
| A1 weight-average molecular weight($\times 10^4$) | 1.5 | 2.0 | 3.0 | 3.9 |
| A2 weight-average molecular weight($\times 10^4$) | 0.8 | 1.0 | 1.0 | 4.0 |
| Styrene(ST) content in A1 (wt %) | 20 | 25 | 22.5 | 40 |
| Styrene(ST) content in A2 (wt %) | 10 | 15 | 7.5 | 40 |
| Butadiene(BD) content in B (wt %) | 70 | 60 | 60 | 20 |
| 1,2-vinyl content (%) | 70 | 60 | 70 | 65 |
| ST/BD (weight ratio) | 30/70 | 40/60 | 40/60 | 80/20 |
| Hydrogenation degree (%) | 98 | 97 | 99 | 98 |
| Weight-average molecular weight($\times 10^4$) | 8 | 9 | 13 | 10 |

TABLE 4

| Hydrogenated block copolymer | iii-14 | iii-15 | iii-16 | iii-17 |
|---|---|---|---|---|
| Pre-hydrogenated copolymer structure | (1) | (1) | (1) | (1) |
| A1 weight-average molecular weight($\times 10^4$) | 1.0 | 2.4 | 2.4 | 2.4 |
| A2 weight-average molecular weight($\times 10^4$) | 1.0 | 2.6 | 2.6 | 2.6 |
| Styrene(ST) content in A1 (wt %) | 10 | 25 | 25 | 25 |
| Styrene(ST) content in A2 (wt %) | 10 | 25 | 25 | 25 |
| Butadiene(BD) content in B (wt %) | 80 | 50 | 50 | 50 |
| 1,2-vinyl content (%) | 80 | 50 | 93 | 80 |
| ST/BD (weight ratio) | 20/80 | 50/50 | 50/50 | 50/50 |
| Hydrogenation degree (%) | 95 | 97 | 96 | 80 |
| Weight-average molecular weight($\times 10^4$) | 10 | 10 | 10 | 10 |

EXAMPLES 1–15, COMPARATIVE EXAMPLES 1–8

Components (i), (ii) and (iii) were mixed according to the mixing formulations listed in Tables 5 to 9 and melt kneading with a twin-screw extruder was followed by pelleting. A test strip for property evaluation was then fabricated by injection molding. The results of the property evaluation are shown in Tables 5 to 9.

TABLE 5

| | Example | | | | |
|---|---|---|---|---|---|
| | 1 | 2 | 3 | 4 | 5 |
| Content of component (i) | 70 | 70 | 70 | 70 | 70 |
| Content of component (ii) | 30 | 30 | 30 | 30 | 30 |
| Type of component (iii) | iii-1 | iii-2 | iii-3 | iii-4 | iii-5 |
| Content of component (iii) | 5 | 5 | 5 | 5 | 5 |
| Rigidity (MPa) | 2340 | 2220 | 2180 | 2250 | 2350 |
| Impact resistance (kgcm/cm) | 36 | 37 | 36 | 39 | 45 |
| Tensile breaking elongation (%) | 45 | 40 | 45 | 55 | 60 |
| Heat resistance (° C) | 145 | 148 | 145 | 149 | 152 |
| Interlayer peeling | ○ | ○ | ○ | ○ | ○ |

TABLE 6

|  | Example | | | | |
| --- | --- | --- | --- | --- | --- |
|  | 6 | 7 | 8 | 9 | 10 |
| Content of component (i) | 70 | 50 | 70 | 70 | 70 |
| Content of component (ii) | 30 | 50 | 30 | 30 | 30 |
| Type of component (iii) | iii-6 | iii-6 | iii-7 | iii-8 | iii-9 |
| Content of component (iii) | 5 | 5 | 5 | 5 | 5 |
| Rigidity (MPa) | 2450 | 2150 | 2380 | 2290 | 2550 |
| Impact resistance (kgcm/cm) | 46 | 55 | 39 | 45 | 45 |
| Tensile breaking elongation (%) | 60 | 110 | 55 | 60 | 70 |
| Heat resistance (° C.) | 153 | 139 | 150 | 148 | 155 |
| Interlayer peeling | ◯ | ◯ | ◯ | ◯ | ◯ |

TABLE 7

|  | Example | | | | |
| --- | --- | --- | --- | --- | --- |
|  | 11 | 12 | 13 | 14 | 15 |
| Content of component (i) | 30 | 50 | 70 | 30 | 70 |
| Content of component (ii) | 70 | 50 | 30 | 70 | 30 |
| Type of component (iii) | iii-10 | iii-11 | iii-12 | iii-1 | iii-1 |
| Content of component (iii) | 5 | 5 | 5 | 5 | 30 |
| Rigidity (MPa) | 1900 | 2100 | 2500 | 1750 | 2190 |
| Impact resistance (kgcm/cm) | 50 | 53 | 43 | 49 | 49 |
| Tensile breaking elongation (%) | 250 | 130 | 80 | 200 | 55 |
| Heat resistance (° C.) | 130 | 140 | 150 | 129 | 149 |
| Interlayer peeling | ◯ | ◯ | ◯ | ◯ | ◯ |

TABLE 8

|  | Comparative example | | | |
| --- | --- | --- | --- | --- |
|  | 1 | 2 | 3 | 4 |
| Content of component (i) | 100 | 70 | 70 | 70 |
| Content of component (ii) | 0 | 30 | 30 | 30 |
| Type of component (iii) | iii-1 | — | iii-1 | iii-13 |
| Content of component (iii) | 5 | — | 60 | 5 |
| Rigidity (MPa) | 2520 | 1930 | 980 | 2150 |
| Impact resistance (kgcm/cm) | 0.1 | 1.5 | 48 | 12 |
| Tensile breaking elongation (%) | 5 | 5 | 100 | 27.2 |
| Heat resistance (° C.) | 170 | 120 | 109 | 149 |
| Interlayer peeling | ◯ | X | ◯ | X |

TABLE 9

|  | Comparative example | | | |
| --- | --- | --- | --- | --- |
|  | 5 | 6 | 7 | 8 |
| Content of component (i) | 70 | 70 | 70 | 70 |
| Content of component (ii) | 30 | 30 | 30 | 30 |
| Type of component (iii) | iii-14 | iii-15 | iii-16 | iii-17 |
| Content of component (iii) | 5 | 5 | 5 | 5 |
| Rigidity (MPa) | 1720 | 2190 | 1850 | 1800 |
| Impact resistance (kgcm/cm) | 20 | 9 | 45 | 19 |
| Tensile breaking elongation (%) | 50 | 15 | 45 | 45 |
| Heat resistance (° C.) | 110 | 115 | 113 | 108 |
| Interlayer peeling | X | X | ◯ | X |

The following conclusions are drawn from the results shown in Tables 5 to 9.

The resin compositions of the invention of Examples 1 to 15 had an excellent balance between rigidity, impact resistance, tensile breaking elongation, heat resistance and interlayer peeling. Particularly excellent rigidity, impact resistance and heat resistance were exhibited by Examples 5 to 13 which employed hydrogenated styrene-butadiene block copolymers with the A1-B-A2 structure, wherein the molecular weight of A1 was 15,000 or more and the molecular weight of A2 was such that the molecular weight ratio A2/A1 was 0.9 or less.

Comparative Example 1 had a mixing ratio of the polyphenylene ether-based resin and polypropylene resin that was outside of the range of the invention, and therefore the impact resistance and tensile breaking elongation were inferior.

Comparative Examples 2 and 3 had hydrogenated block copolymer contents that were outside of the range of the invention, and therefore the impact resistance, tensile breaking elongation, heat resistance and interlayer peeling were inferior in Comparative Example 2, while the rigidity and heat resistance were inferior in Comparative Example 3.

Comparative Examples 4 and 5 had vinyl aromatic compound contents in the hydrogenated block copolymers that were outside of the range of the invention, and therefore the impact resistance and interlayer peeling were inferior in Comparative Example 4, while the rigidity and interlayer peeling were inferior in Comparative Example 5.

Comparative Examples 6 and 7 had conjugated diene portion 1,2-vinyl content in the hydrogenated block copolymers that were outside of the range of the invention, and therefore the impact resistance, tensile breaking elongation, heat resistance and interlayer peeling were inferior in Comparative Example 6, while the rigidity and heat resistance were inferior in Comparative Example 7.

Comparative Example 8 had a conjugated diene portion hydrogenation degree of the hydrogenated block copolymer that was outside the range of the invention, and therefore the rigidity, impact resistance, heat resistance and interlayer peeling were inferior.

What is claimed is:

1. A thermoplastic resin composition comprising
   (i) a polyphenylene ether-based resin, (ii) a polyolefin resin and (iii) a hydrogenated block copolymer, wherein said hydrogenated block copolymer is a block copolymer comprising block A, block A comprising over 50 wt % of a vinyl aromatic compound component, and block B, block B comprising over 50 wt % of a conjugated diene compound component, the 1,2- and 3,4-vinyl content of a conjugated diene compound component of said copolymer being 60–90%, the content of a vinyl aromatic compound component being 30–70 wt % and at least 85% of the double bonds of said conjugated diene component are hydrogenated;

a weight ratio ((i)/(ii)) of said (i) polyphenylene ether-based resin and (ii) said polyolefin resin is in the range of 95/5–5/95; and said (iii) hydrogenated block copolymer is present in the range of 1–50 parts by weight to 100 parts by weight of the total weight of said (i) polyphenylene ether-based resin and said (ii) polyolefin resin, wherein the structure of the (iii) hydrogenated block copolymer is represented by A1-B-A2 or A1-B-A2-B, wherein A1 and A2 are each block A of said vinyl aromatic compounds component with different structures, and the weight-average molecular weight of A1 is 15,000 or more and the ratio of the weight average molecular weight of A2 to the weight average molecular weight of A1 (A2/A1) is 0.9 or less.

2. The thermoplastic resin composition according to claim 1, wherein the (i) polyphenylene ether-based resin is at least one selected from the group consisting of poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether).

3. The thermoplastic resin composition according to claim 1, wherein the (ii) polyolefin resin is at least one selected from the group consisting of polyethylene-based resin, polypropylene-based resin, polybutene-1-based resin, and poly-4-methylpentene-1-based resin.

4. The thermoplastic resin composition according to claim 1, wherein the vinyl aromatic compound component is at least one selected from the group consisting of styrene, a-methylstyrene, p-methylstyrene, t-butylstyrene, divinylbenzene, N,N-dimethyl-p-aminoethyistyrene, 2,4-dimethyistyrene, N,N-diethyl-p-aminoethylstyrene, vinylnaphthalene and vinylanthracene.

5. The thermoplastic resin composition according to claim 1, wherein the conjugated diene compound component is at least one selected from the group consisting of 1,3-butadiene, isoprene, 2,3-dimethyl-1,3-butadiene, 1,3-pentadiene, 2-methyl-1,3-pentadiene, 1,3-hexadiene, 4,5-dimethyl-1,3-octadiene, myrcene and chloroprene.

6. The thermoplastic resin composition according to claim 1, wherein the (iii) hydrogenated block copolymer is a modified hydrogenated block copolymer with at least one functional group selected from the group consisting of acid anhydride, carboxyl, hydroxyl, amino, isocyanate and epoxy groups.

7. A thermoplastic resin composition according to claim 1, wherein the (ii) polyolefin resin is modified polyolefin resin with at least one functional group selected from among acid anhydride, carboxyl, hydroxyl, amino, isocyanate and epoxy groups.

8. The thermoplastic resin composition according to claim 1, wherein the (i) polyphenylene-based resin is a modified polyphenylene-based resin prepared by reacting a polypheneylene-based resin with at least one selected from the group consisting of styrene-based monomers, α,β-unsaturated carboxylic acids, mixtures thereof and derivatives thereof.

9. The thermoplastic resin composition according to claim 8, wherein the (ii) polyolefin resin is at least one selected from the group consisting of polyethylene-based resin, polypropylene-based resin, polybutene-1-based resin, and poly-4-methylpentene-1-based resin.

10. The thermoplastic resin composition according to claim 1, wherein the polypropylene based resin is a copolymer.

11. The thermoplastic resin composition according to claim 10, wherein the copolymer comprises no less than 80% propylene.

12. The thermoplastic resin composition according to claim 10, wherein the polyolefin resin has a melt flow rate of from 0.1 to 150 g/10 min.

13. The thermoplastic resin composition according to claim 1, wherein the hydrogenated block copolymer has a weight average molecular weight of from 20,000 to 500,000.

14. The thermoplastic resin composition according to claim 1, wherein block A has a weight average molecular weight of 20,000 or more and a ratio of the weight average molecular weight of block A2 to the weight average molecular weight of block A1 is 0.8 or less.

* * * * *